US009647253B2

(12) United States Patent
Takita et al.

(10) Patent No.: US 9,647,253 B2
(45) Date of Patent: May 9, 2017

(54) METHODS OF PRODUCING AND USING MICROPOROUS MEMBRANES

(71) Applicant: Toray Battery Separator Film Co., Ltd., Nasushiobara (JP)

(72) Inventors: Kotaro Takita, Nasushiobara (JP); Yoichi Matsuda, Nasushiobara (JP); Sadakatsu Suzuki, Nasushiobara (JP)

(73) Assignee: Toray Battery Separator Film Co., Ltd. (JP)

( * ) Notice: Subject to any disclaimer, the term of this patent is extended or adjusted under 35 U.S.C. 154(b) by 335 days.

(21) Appl. No.: 14/340,687

(22) Filed: Jul. 25, 2014

(65) Prior Publication Data
US 2014/0332998 A1 Nov. 13, 2014

Related U.S. Application Data

(62) Division of application No. 13/129,654, filed as application No. PCT/JP2009/069143 on Nov. 4, 2009, now abandoned.
(Continued)

(30) Foreign Application Priority Data

Jan. 26, 2009 (EP) .................................... 09151318
Jan. 26, 2009 (EP) .................................... 09151320

(51) Int. Cl.
*H01M 2/14* (2006.01)
*B29C 55/02* (2006.01)
(Continued)

(52) U.S. Cl.
CPC ........ *H01M 2/145* (2013.01); *B01D 67/0027* (2013.01); *B01D 71/26* (2013.01);
(Continued)

(58) Field of Classification Search
CPC ....... B29C 55/023; B29C 55/12; B29C 55/14; B29C 55/143; B29C 55/146; B29C 55/16;
(Continued)

(56) References Cited

U.S. PATENT DOCUMENTS 6,245,272 B1 * 6/2001 Takita .................... B01D 69/02
210/500.42
6,949,315 B1 9/2005 Samii et al.
(Continued)

FOREIGN PATENT DOCUMENTS

EP 1 905 586 A1 4/2008
EP 1 911 795 A1 4/2008
(Continued)

OTHER PUBLICATIONS

Thomas Sun et al., "Effect of Short Chain Branching on the Coil Dimensions of Polyolefins in Dilute Solution," *Macromolecules*, vol. 34, No. 19, 2001, pp. 6812-6820.

*Primary Examiner* — Jeffrey Wollschlager
(74) *Attorney, Agent, or Firm* — DLA Piper LLP (US)

(57) ABSTRACT

A method of producing microporous membranes includes stretching a multi-layer layer extrudate having first and second layers, the first layer including a first polyolefin and a first diluent, and the second layer including a second polyolefin and a second diluent, the second polyolefin including polypropylene in an amount of 1.0 wt. % to 40.0 wt. %, the polypropylene having an $Mw > 0.9 \times 10^6$ and a $\Delta Hm \geq 100.0$ J/g; removing at least a portion of the diluents to produce a dried membrane having a first length and a first width; stretching the membrane by a first magnification factor of 1.1 to 1.5 and stretching the membrane by a second magnification factor of 1.1 to 1.3; and reducing the width.

10 Claims, 3 Drawing Sheets

Related U.S. Application Data

(60) Provisional application No. 61/115,410, filed on Nov. 17, 2008, provisional application No. 61/115,405, filed on Nov. 17, 2008.

(51) Int. Cl.

| | | |
|---|---|---|
| *B01D 67/00* | (2006.01) | |
| *B01D 71/26* | (2006.01) | |
| *H01M 2/16* | (2006.01) | |
| *H01M 10/052* | (2010.01) | |
| *B29K 23/00* | (2006.01) | |
| *B29K 105/00* | (2006.01) | |
| *B29L 9/00* | (2006.01) | |
| *B29L 31/34* | (2006.01) | |
| *B29L 31/00* | (2006.01) | |

(52) U.S. Cl.
CPC ......... *B29C 55/023* (2013.01); *H01M 2/1653* (2013.01); *H01M 2/1686* (2013.01); *B01D 2323/10* (2013.01); *B29K 2023/06* (2013.01); *B29K 2023/12* (2013.01); *B29K 2105/256* (2013.01); *B29K 2995/0097* (2013.01); *B29L 2009/00* (2013.01); *B29L 2031/3468* (2013.01); *B29L 2031/755* (2013.01); *H01M 10/052* (2013.01)

(58) Field of Classification Search
CPC .......... H01M 2/145; H01M 2/14; H01M 2/16; H01M 2/164; H01M 2/1686
See application file for complete search history.

(56) References Cited

U.S. PATENT DOCUMENTS

| | | | | |
|---|---|---|---|---|
| 7,323,274 | B1 | 1/2008 | Samii et al. | |
| 7,700,182 | B2* | 4/2010 | Ozaki | B01D 67/0025 264/3.3 |
| 7,988,895 | B2* | 8/2011 | Takita | B01D 67/002 264/176.1 |
| 8,597,775 | B2* | 12/2013 | Rhee | B01D 71/26 428/212 |
| 8,906,539 | B2* | 12/2014 | Takita | B32B 27/32 429/144 |
| 8,932,748 | B2* | 1/2015 | Kikuchi | B32B 27/32 429/145 |
| 9,431,642 | B2* | 8/2016 | Kikuchi | B01D 67/0027 |
| 2005/0019665 | A1 | 1/2005 | Adachi et al. | |
| 2006/0103055 | A1* | 5/2006 | Hoshuyama | B01D 67/0027 264/479 |
| 2007/0218271 | A1 | 9/2007 | Lee et al. | |
| 2007/0264483 | A1* | 11/2007 | Ozaki | B01D 67/0025 428/304.4 |
| 2008/0193833 | A1* | 8/2008 | Ohashi | B32B 27/32 429/129 |
| 2009/0075049 | A1* | 3/2009 | Jung | B29C 55/14 428/220 |
| 2009/0226814 | A1* | 9/2009 | Takita | B01D 67/0027 429/247 |
| 2009/0274955 | A1* | 11/2009 | Kikuchi | B01D 67/0027 429/144 |
| 2010/0099838 | A1* | 4/2010 | Takeda | B01D 71/26 526/348 |
| 2011/0003178 | A1* | 1/2011 | Ishihara | B01D 69/125 429/7 |
| 2011/0159343 | A1* | 6/2011 | Yamada | B01D 67/0009 429/129 |

FOREIGN PATENT DOCUMENTS

| | | | |
|---|---|---|---|
| EP | 1 930 156 | A1 | 6/2008 |
| EP | 1 942 000 | A1 | 7/2008 |
| JP | 2000-198866 | A | 7/2000 |
| JP | 2001-172420 | A | 6/2001 |
| JP | 2001-192487 | A | 7/2001 |
| WO | 97/23554 | A1 | 7/1997 |
| WO | WO2007010878 | * | 1/2007 |
| WO | 2007/049568 | A1 | 5/2007 |
| WO | 2007/132942 | A1 | 11/2007 |
| WO | 2008/016174 | A1 | 2/2008 |

* cited by examiner

METHODS OF PRODUCING AND USING MICROPOROUS MEMBRANES

TECHNICAL FIELD

This disclosure relates to multi-layer microporous polymeric membranes suitable for use as battery separator film. The disclosure also relates to methods of producing such membranes, batteries containing such membranes as battery separators, methods of making such batteries, and methods of using such batteries.

BACKGROUND

Microporous membranes can be used as battery separators in, e.g., primary and secondary lithium batteries, lithium polymer batteries, nickel-hydrogen batteries, nickel-cadmium batteries, nickel-zinc batteries, silver-zinc secondary batteries and the like. When microporous polyolefin membranes are used for battery separators, particularly lithium ion battery separators, the membranes' characteristics significantly affect the properties, productivity and performance of the batteries. Accordingly, it is desirable for the microporous membrane to have resistance to thermal shrinkage, particularly at elevated temperature. Resistance to thermal shrinkage (or "heat shrinkage") can improve the battery's protection against internal short circuiting that might otherwise occur as the separator shrinks away from the edges of the battery's electrodes at elevated temperature.

European Patent Application Publication No. EP 1 905 586 (published Feb. 2, 2008) discloses multi-layer polymeric membranes useful as battery separator film. One of the membranes exemplified has a transverse direction heat shrinkage of 2% at 105° C.

Japanese patent document JP2000198866 (published Jul. 18, 2000) discloses multi-layer battery separator films having heat shrinkage values of 10%. The membrane comprises layers containing alpha-olefin-CO copolymers and an inorganic species (cross-linked silicone powders).

PCT publication WO2007-049568 (published May 3, 2007) also discloses multi-layer battery separator films having a machine direction heat-shrinkage value of 4% and a transverse direction heat shrinkage value of 3%. The films of this reference comprise a core layer containing heat-resistant polymers or an inorganic filler.

U.S. Patent Publication 2007/0218271 discloses monolayer microporous films having machine and transverse direction heat shrinkage values of 4% or less. The films of this reference are produced from high density polyethylene having a weight-average molecular weight of $2 \times 10^5$ to $4 \times 10^5$, containing not more than 5 wt. % of molecules with a molecular weight of $1 \times 10^4$ or less and not more than 5 wt. % of molecules having a molecular weight of $1 \times 10^6$ or more.

Japanese Patent Application Laid Open No. JP2001-192487 discloses monolayer microporous membranes having transverse direction heat shrinkage values as low as 1.8%, but at a relatively low permeability (Gurley value of 684 seconds). Similarly, Japanese Patent Application Laid Open No. JP2001-172420 discloses monolayer microporous membranes having transverse direction heat shrinkage values as low as 1.1%, but at a Gurley value above 800.

While improvements have been made, there is still a need for battery separator film having increased resistance to heat shrinkage.

SUMMARY

In one example, the disclosure relates to a microporous membrane comprising polypropylene having an Mw>$0.9 \times 10^6$, the membrane having a 130° C. heat shrinkage ≤8.0% in at least one planar direction and a normalized air permeability ≤$4.0 \times 10^2$ seconds/100 cm³.

In another example, the disclosure relates to a method of producing a microporous membrane, comprising,
(a) stretching a multi-layer layer extrudate in at least one of MD or TD, the extrudate comprising at least first and second layers, the first layer comprising a first polyolefin and at least a first diluent, and the second layer comprising a second polyolefin and at least a second diluent, the second polyolefin comprising polypropylene in an amount from 1.0 wt. % to 40.0 wt. % based on the weight of the second polyolefin, the polypropylene having an Mw>$0.9 \times 10^6$ and a ΔHm≥100.0 J/g;
(b) removing at least a portion of the first and second diluents from stretched extrudate to produce a dried membrane having a first length along MD and a first width along TD;
(c) stretching the membrane in MD from the first length to a second length larger than the first length by a first magnification factor from about 1.1 to about 1.5 and stretching the membrane in TD from the first width to a second width that is larger than the first width by a second magnification factor from about 1.1 to about 1.3; and then
(d) reducing the second width to a third width, the third width being in the range of from the first width to about 1.1 times larger than the first width.

In yet another example, the disclosure relates to a battery comprising an anode, a cathode, an electrolyte, and at least one battery separator located between the anode and the cathode, the battery separator comprising the microporous membrane of any of the preceding examples. The battery can be, e.g., a lithium ion primary or secondary battery. The battery can be used as a power source, e.g., as a power source for a power tool such as a battery-operated saw or drill.

DETAILED DESCRIPTION

Figure 1:
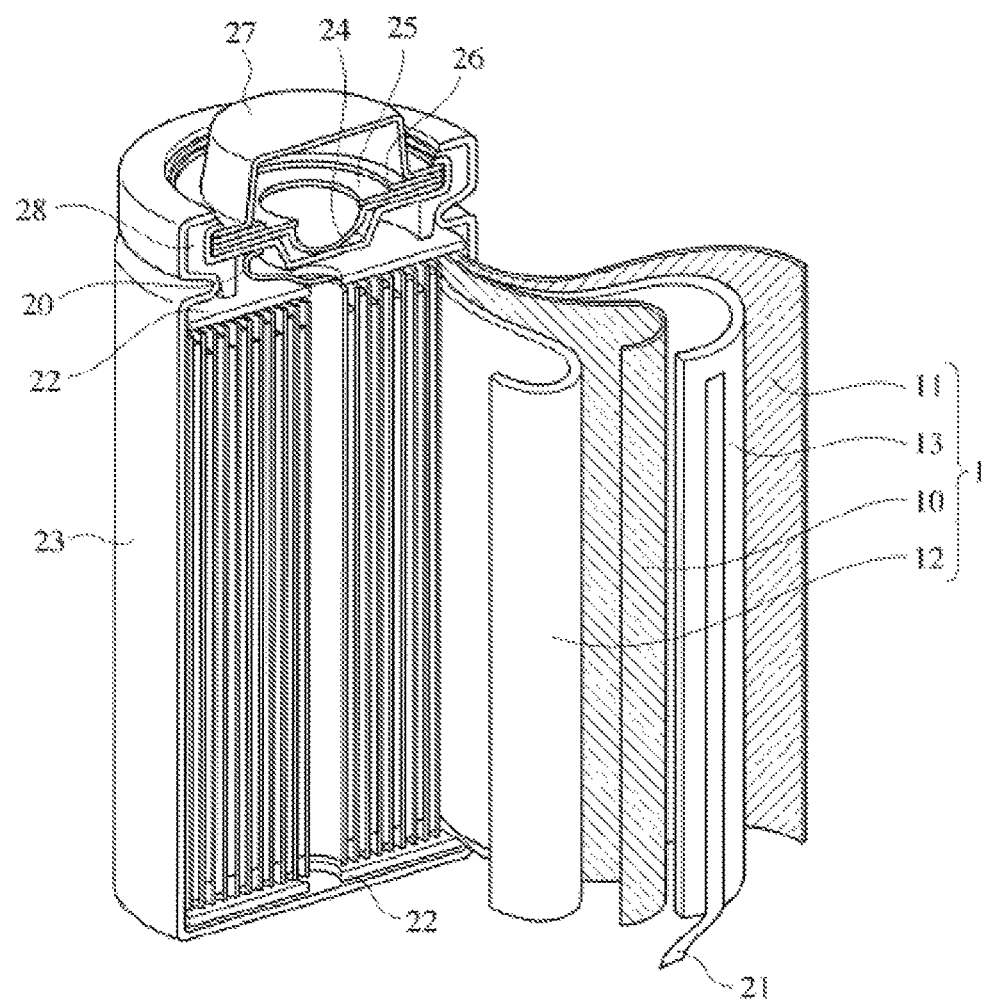
FIG. 1 is a cross-sectioned, perspective view showing one example of cylindrical type lithium ion secondary battery comprising an electrode assembly.

One battery failure mode involves the high temperature softening of membranes used as battery separator film and a loss of dimensional stability especially near the edges of the membrane. Should the width of the membrane decrease at a temperature above the membrane's shutdown temperature (generally much higher than 105° C.), the close spacing between anode, cathode, and separator can lead to an internal short circuit in the battery. This is particularly the case in prismatic and cylindrical batteries, where even a small change in membrane width can result in anode-cathode contact at or near the battery's edges.

We discovered microporous membranes having a relatively high meltdown temperature (≥170.0° C.), relatively high pin puncture strength (≥$2.0 \times 10^3$ Mn, e.g., ≥$3.0 \times 10^3$ Mn), and improved heat shrinkage properties, i.e., better dimensional stability at elevated temperature. The improvement in heat shrinkage properties is observed not only at relatively low temperatures (e.g., below about 110° C., which is within the operating temperature range of conventional lithium ion batteries), but also at relatively high temperatures (e.g., above 125° C., or above 135° C., e.g., above the shutdown temperature of conventional battery separator film for lithium ion batteries).

Since a battery separator film might not be softened sufficiently at 105° C. to exhibit poor heat shrinkage, the film's heat shrinkage performance at 105° C. is not always a reliable indicator of the potential for internal battery short circuiting. In contrast, the film's maximum heat shrinkage in the molten state is measured at a temperature that is above the membrane's shutdown temperature, and thus can be a better indicator for this type of internal short circuiting. Maximum heat shrinkage in the molten state is generally not predictable solely from the membrane's heat shrinkage performance at 105° C.

Structure and Composition of the Multi-Layer Microporous Membrane

In an example, the microporous membrane comprises first and second layers. The first layer comprises a first layer material, and the second layer comprises an independently selected second layer material. The first and second layer materials can be, e.g., independently selected polyolefins. For example, the membrane has a planar top layer when viewed from above on an axis approximately perpendicular to planar axes along the length and width of the membrane, and a planar bottom layer that is parallel or approximately parallel to the top layer. In another example, the multi-layer microporous membrane comprises three or more layers, e.g., a membrane having first and third layers and a second layer located between the first and third layers. While the third layer can comprise an independently selected third layer material, this is not required. When the multi-layer microporous membrane has three or more layers, at least one layer comprises the first microporous layer material and at least one layer comprises the second microporous layer material. In an example, the first and third layers are produced from (and generally comprise) substantially the same polymer or mixture of polymers (e.g., both are produced from the first layer material).

In an example, the multi-layer, microporous membrane comprises three layers, wherein the first and third layers (also called the "surface" or "skin" layers) comprise outer layers of the membrane and the second layer is an intermediate layer (or "core" layer) located between the first and third layers. In a related example, the multi-layer, microporous membrane can comprise additional layers, i.e., in addition to the two skin layers and the core layer. For example, the membrane can contain additional core layers between the first and third layers. The membrane can be a coated membrane, i.e., it can have one or more additional layers on or applied to the first and third layers. Generally, the second layer of the membrane has a thickness of 5% to 15% of the membrane's total thickness; and the first and third layers of the membrane have the same thickness, the thickness of the first and third layer each being 42.5% to 47.5% of the membrane's total thickness.

Optionally, the core layer is in planar contact with one or more of the skin layers in a stacked arrangement such as A/B/A with face-to-face stacking of the layers. The membrane can be referred to as a "polyolefin membrane" when the membrane contains polyolefin. While the membrane can contain polyolefin only, this is not required, and it is within our scope for the polyolefin membrane to contain polyolefin and materials that are not polyolefin. Optionally, the polyolefins can be produced, e.g., in a process using a chromium catalyst, a Ziegler-Natta catalyst, or a single-site polymerization catalyst. The term "polymer" means a composition including a plurality of macromolecules, the macromolecules containing recurring units derived from one or more monomers. The macromolecules can have different size, molecular architecture, atomic content and the like. The term "polymer" includes macromolecules such as copolymer, terpolymer and the like, and encompasses individual polymer components and/or reactor blends. The term "polyolefin" means polymer containing recurring units derived from olefin, e.g., poly-α olefin such as polypropylene and/or polyethylene. "Polypropylene" means polyolefin containing recurring propylene-derived units, e.g., polypropylene homopolymer and/or polypropylene copolymer wherein at least 85% (by number) of the recurring units are propylene units. "Polyethylene" means polyolefin containing recurring ethylene-derived units, e.g., polyethylene homopolymer and/or polyethylene copolymer wherein at least 85% (by number) of the recurring units are ethylene units. The first and second layer materials will now be described in more detail.

In an example, the first layer material comprises a first polyethylene having a weight-average molecular weight ("Mw")$\leq 1.0 \times 10^6$ and a second polyethylene having an Mw$>1.0 \times 10^6$. The third layer material comprises a first polyethylene having an Mw$\leq 1.0 \times 10^6$ and a second polyethylene having an Mw$>1.0 \times 10^6$. The second layer material comprises polypropylene. It is conventional for microporous membranes used as BSFs to contain polypropylene for achieving high meltdown temperatures, e.g., $\geq 170.0°$ C. But adding sufficient polypropylene (e.g., $\geq 2.0$ wt. % based on the weight of the membrane) to achieve a high meltdown temperature generally decreases high temperature stability (e.g., increases heat shrinkage, especially at elevated temperature) and decreases pin puncture strength. In an example, the membranes overcome this difficulty.

In one example, the second layer material comprises a first polyethylene having an Mw$\leq 1.0 \times 10^6$, polypropylene having an Mw$>0.9 \times 10^6$, and optionally a second polyethylene having an Mw$>1.0 \times 10^6$. Optionally, the first polyethylene of the second and/or third layer material is the same first polyethylene as in the first layer material. Optionally, the second polyethylene of the second and/or third layer material is the same second polyethylene as in the first layer material. In an example, neither the first nor third layer material contains polypropylene in an amount greater than 0.5 wt. %. In a related example, the first and/or third layer material consists essentially of polyethylene, e.g., substantially the same polyethylene or combination of polyethylenes.

In an example, the first layer material comprises about 90.0 wt. % to about 99.0 wt. %, e.g., 92.5 wt. % to about 97.5 wt. %, of the first polyethylene and about 1.0 wt. % to about 1.0 wt. %, e.g., about 2.5 wt. % to about 7.5 wt. %, of the second polyethylene; the weight percents being based on the weight of the first layer material. In an example, the polyethylenes of the third layer material are selected from among substantially the same polyethylenes in approximately the same concentration ranges as the first layer material.

In an example, the second layer material comprises the first polyethylene, the polypropylene, for example, $\leq 40.0$ wt. % polypropylene, and optionally the second polyethylene. For example, the second layer material can comprise about 60.0 wt. % to about 95.0 wt. %, of the first polyethylene, about 5.0 wt. % to about 40.0 wt. % of the polypropylene, and about 0.0 wt. % to about 10.0 wt. % of the second polyethylene, the weight percents being based on the weight of the second layer material. In another example, the second layer material comprises about 60.0 wt. % to about 75.0 wt. % of the first polyethylene, about 25.0 wt. % to about 35.0 wt. % of the polypropylene, and about 0.5 wt. % to about 5.0 wt. % of the second polyethylene, the weight percents being based on the weight of the second layer material. In an example, the microporous membrane comprises polypropylene in an amount ≤8.0 wt. % based on the total weight of the microporous membrane, e.g., 2.2 wt. % to 7.0 wt. %.

Optionally, the microporous membranes contain copolymers, inorganic species (such as species containing silicon and/or aluminum atoms), and/or heat-resistant polymers such as those described in PCT Publications WO 2007/132942 and WO 2008/016174. In an example, membrane is substantially free of such materials. Substantially free in this context means the amount of such materials in the microporous membrane is ≤1.0 wt. %, based on the total weight of the polymer used to produce the microporous membrane.

The final microporous membrane generally comprises the polymer used to produce the extrudate. A small amount of diluent or other species introduced during processing can also be present, generally in amounts ≤1.0 wt. % based on the weight of the microporous membrane. A small amount of polymer molecular weight degradation might occur during processing, but this is acceptable. In an example, the Mw of the polymers in the membrane decrease by a factor of ≤10%, for example, or ≤1.0%, or ≤0.1% of the Mw of the polymers used to produce the membrane.

The polypropylene, the first and second polyethylenes, and the diluents used to produce the extrudate and the microporous membrane will now be described in more detail. The disclosure is not limited to these examples, and the following description is not meant to foreclose other examples within the broader scope of this disclosure.

Materials Used to Produce the Microporous Membrane

In an example, the first and third layer materials are produced from the first diluent and the first and second polyethylenes; and the second layer material is produced from the second diluent, the first polyethylene, the polypropylene, and optionally the second polyethylene. Optionally, inorganic species (such as species containing silicon and/or aluminum atoms), and/or heat-resistant polymers such as those described in PCT Publications WO 2007/132942 and WO 2008/016174 (both of which are incorporated by reference herein in their entirety) can be used to produce the first, second, and/or third layer materials. In an example, these optional species are not used.

A. The First Polyethylene

In an example, the first polyethylene has an Mw≤$1.0×10^6$, e.g., about $1.0×10^5$ to about $0.90×10^6$, a molecular weight distribution ("MWD") of about 2.0 to about 50.0, and a terminal unsaturation amount <0.20 per $1.0×10^4$ carbon atoms. ("PE1"). Optionally, the first polyethylene has an Mw of about $4.0×10^5$ to about $6.0×10^5$, and an MWD of about 3.0 to about 10.0. Optionally, the first polyethylene has an amount of terminal unsaturation ≤0.14 per $1.0×10^4$ carbon atoms, or ≤0.12 per $1.0×10^4$ carbon atoms, e.g., of 0.05 to 0.14 per $1.0×10^4$ carbon atoms (e.g., below the detection limit of the measurement). PE1 can be a high density polyethylene ("HDPE"), e.g., SH-800® polyethylene, available from Asahi.

In another example, the first polyethylene has an Mw<$1.0×10^6$, e.g., about $2.0×10^5$ to about $0.9×10^6$, an MWD of about 2 to about 50, and a terminal unsaturation amount ≥0.20 per 10,000 carbon atoms. ("PE2"). Optionally, the first polyethylene has an amount of terminal unsaturation ≥0.30 per $1.0×10^4$ carbon atoms, or ≥0.50 per $1.0×10^4$ carbon atoms, e.g., of 0.6 to 10.0 per $1.0×10^4$ carbon atoms. A non-limiting example of the first polyethylene is one having an Mw of about $3.0×10^5$ to about $8.0×10^5$, for example, about $7.5×10^5$, and an MWD of about 4 to about 15. PE2 can be HDPE, e.g., Lupolen, available from Basell. The first polyethylene can be a mixture of PE1 and PE2.

The first polyethylene can be, e.g., an ethylene homopolymer or an ethylene/α-olefin copolymer containing ≤5.0 mole % of one or more comonomer such as α-olefin, based on 100% by mole of the copolymer. Optionally, the α-olefin is one or more of propylene, butene-1, pentene-1, hexene-1,4-methylpentene-1, octene-1, vinyl acetate, methyl methacrylate, or styrene. PE1 can be produced, e.g., in a process using a Ziegler-Natta or single-site polymerization catalyst, but this is not required. The amount of terminal unsaturation can be measured in accordance with the procedures described in PCT Publication WO97/23554, for example. PE2 can be produced using a chromium-containing catalyst, for example.

The Mw and MWD (MWD defined as Mw/Mn where Mn is the number average molecular weight) of the first polyethylene are determined using a High Temperature Size Exclusion Chromatograph, or "SEC," (GPC PL 220, Polymer Laboratories), equipped with a differential refractive index detector (DRI). Three PLgel Mixed-B columns (available from Polymer Laboratories) are used. The nominal flow rate is 0.5 cm$^3$/min, and the nominal injection volume was 300 μL. Transfer lines, columns, and the DRI detector were contained in an oven maintained at 145° C. The measurement is made in accordance with the procedure disclosed in "*Macromolecules*, Vol. 34, No. 19, pp. 6812-6820 (2001)."

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. Polymer solutions are prepared by placing dry polymer in a glass container, adding the desired amount of above TCB solvent, then heating the mixture at 160° C. with continuous agitation for about 2 hours. The concentration of UHMWPE solution was 0.25 to 0.75 mg/ml. Sample solution are filtered off-line before injecting to GPC with a 2 μm filter using a model SP260 Sample Prep Station (available from Polymer Laboratories).

The separation efficiency of the column set is calibrated with a calibration curve generated using seventeen individual polystyrene standards ranging in Mp ("Mp" being defined as the peak in Mw) from about 580 to about 10,000,000, which is used to generate the calibration curve. The polystyrene standards are obtained from Polymer Laboratories (Amherst, Mass.). A calibration curve (logMp vs. retention volume) is generated by recording the retention volume at the peak in the DRI signal for each PS standard, and fitting this data set to a 2nd-order polynomial. Samples are analyzed using IGOR Pro, available from Wave Metrics, Inc.

B. The Second Polyethylene

In an example, the second polyethylene has an Mw>$1.0×10^6$, e.g., about $1.0×10^6$ to about $5.0×10^6$ and an MWD of about 1.2 to about 50.0. A non-limiting example of the second polyethylene is one having an Mw of about $1.0×10^6$ to about $3.0×10^6$, for example, about $2.0×10^6$, and an MWD of about 2.0 to about 20.0, preferably about 4.0 to 15.0. The second polyethylene can be, e.g., an ethylene homopolymer or an ethylene/α-olefin copolymer containing 5.0 mole % of one or more comonomers such as α-olefin, based on 100% by mole of the copolymer. The comonomer can be, for example, one or more of, propylene, butene-1, pentene-1, hexene-1,4-methylpentene-1, octene-1, vinyl acetate, methyl methacrylate, or styrene. Such copolymer can be produced using a Ziegler-Natta or a single-site catalyst, though this is not required. The second polyethylene can be ultra-high molecular weight polyethylene ("UHMWPE"), e.g., 240-m® polyethylene, available from Mitsui.

The Mw, Mn, and MWD of the second polyethylene are determined the same way as for the first polyethylene.

C. The Polypropylene

In an example, the polypropylene has an Mw >0.9×10$^6$, for example, about 1.0×10$^6$ to about 2.0×10$^6$ such as about 1.1×10$^6$ to about 1.5×10$^6$. Optionally, the polypropylene has an MWD≤100, e.g., about 1.1 to about 50.0, or about 2.0 to about 6.0; and/or a heat of fusion ("ΔHm")≥100.0 J/g, e.g., 110 J/g to 120 J/g such as about 113 J/g to 119 J/g or 114 J/g to about 116 J/g. The polypropylene can be, for example, one or more of (i) a propylene homopolymer or (ii) a copolymer of propylene and a ≤10.0 mole % comonomer, based on 100% by mole of the entire copolymer. The copolymer can be a random or block copolymer. The comonomer can be, for example, one or more of α-olefins such as ethylene, butene-1, pentene-1, hexene-1, 4-methylpentene-1, octene-1, vinyl acetate, methyl methacrylate, styrene and the like; and diolefins such as butadiene, 1,5-hexadiene, 1,7-octadiene, 1,9-decadiene and the like. Optionally, the polypropylene has one or more of the following properties: (i) the tacticity is isotactic; (ii) an elongational viscosity of at least about 50,000 Pa sec at a temperature of 230° C. and a strain rate of 25 sec$^{-1}$; (iii) a melting peak Tm (second melt) of at least about 160° C., e.g., greater than about 166° C., or even greater than about 168° C., or even greater than about 170° C. (the melting point can be determined by conventional methods, e.g., differential scanning calorimetry (DSC)); (iv) a Trouton's ratio of at least about 15 when measured at a temperature of about 230° C. and a strain rate of 25 sec$^{-1}$; (v) an elongational viscosity of at least about 5.0×10$^4$ Pa sec at a temperature of 230° C. and a strain rate of 25 sec$^{-1}$; (vi) an Mw≥1.75×10$^6$, or ≥2.0×10$^6$, or ≥2.25×10$^6$, such as, for example, ≥2.5×10$^6$; (vii) a Melt Flow Rate (MFR) at 230° C. and 2.16 kg weight of ≤about 0.01 dg/min (i.e., a value is low enough that the MFR is essentially not measurable; Melt Flow Rate is determined in accordance with conventional methods such as ASTM D 1238-95 Condition L); (viii) exhibits stereo defects of ≤50.0 per 1.0×10$^4$ carbon atoms, or ≤40.0, or ≤30.0, or even ≤20.0 per 1.0×10$^4$ carbon atoms, e.g., the polypropylene can have fewer than about 10.0, or fewer than about 5.0 stereo defects per 1.0×10$^4$ carbon atoms; (ix) a meso pentad fraction of greater than about 96 mol % mmmm pentads; and/or (x) an amount extractable species (extractable by contacting the polypropylene with boiling xylene) of ≤0.5 wt. %, or ≤0.2 wt. %, or ≤0.1 wt. % based on the weight of the polypropylene.

The polypropylene's ΔHm, is determined by the methods disclosed in PCT Patent Publication No. WO2007/132942, which is incorporated by reference herein in its entirety. Tm can be determined from differential scanning calorimetric (DSC) data obtained using a PerkinElmer Instrument, model Pyris 1 DSC. Samples weighing approximately 5.5-6.5 mg are sealed in aluminum sample pans. The DSC data are recorded by first heating the sample to 200° C. at a rate of 150° C./minute, called first melt (no data recorded). The sample is kept at 200° C. for 10 minutes before a cooling-heating cycle is applied. The sample is then cooled from 200° C. to 25° C. at a rate of 10° C./minute, called "crystallization," then kept at 25° C. for 10 minutes, and then heated to 200° C. at a rate of 10° C./minute, called ("second melt"). The thermal events in both crystallization and second melt are recorded. The melting temperature ($T_m$) is the peak temperature of the second melting curve and the crystallization temperature ($T_c$) is the peak temperature of the crystallization peak.

Meso pentad fraction can be determined from $^{13}$C NMR data obtained at 100 MHz at 125° C. on a Varian VXR 400 NMR spectrometer. A 90° C. pulse, an acquisition time of 3.0 seconds, and a pulse delay of 20 seconds are employed. The spectra are broad band decoupled and acquired without gated decoupling. Similar relaxation times and nuclear Overhauser effects are expected for the methyl resonances of polypropylenes, which are generally the only homopolymer resonances used for quantitative purposes. A typical number of transients collected is 2500. The sample is dissolved in tetrachlorethane-d$_2$ at a concentration of 15% by weight. All spectral frequencies are recorded with respect to an internal tetramethylsilane standard. In the case of polypropylene homopolymer, the methyl resonances are recorded with respect to 21.81 ppm for mmmm, which is close to the reported literature value of 21.855 ppm for an internal tetramethylsilane standard. The pentad assignments used are well established.

The amount of extractable species (such as relatively low molecular weight and/or amorphous material, e.g., amorphous polyethylene) is determined by solubility in xylene at 135° C., according to the following procedure. Weigh out 2 grams of sample (either in pellet or ground pellet form) into 300 ml conical flask. Pour 200 ml of xylene into the conical flask with stir bar and secure the flask on a heating oil bath. Turn on the heating oil bath and allow melting of the polymer by leaving the flask in oil bath at 135° C. for about 15 minutes. When melted, discontinue heating, but continue stirring through the cooling process. Allow the dissolved polymer to cool spontaneously overnight. The precipitate is filtered with Teflon filter paper and then dried under vacuum at 90° C. The quantity of xylene soluble is determined by calculating the percent by weight of total polymer sample ("A") less precipitate ("B") at room temperature [soluble content=((A−B)/A)×100].

The Mw and Mn of the polypropylene are determined by the method disclosed in PCT Patent Publication No. WO2007/132942, which is incorporated by reference herein in its entirety.

Methods of Producing the Microporous Membrane

In an example, the multi-layer microporous membrane is a two-layer membrane. In another example, the multi-layer microporous membrane has at least three layers. Although our methods are not limited thereto, the method of producing the microporous membrane will mainly be described in terms of a three layer membrane having first and third layers comprising the first layer material and a second layer comprising the second layer material located between the first and third layers.

One method of producing the multi-layer microporous membrane involves layering such as by lamination or coextrusion of extrudates or membranes, e.g., monolayer extrudates or monolayer microporous membranes. For example, one or more layers comprising the first layer material can be coextruded with one or more layers comprising the second layer material, e.g., with the layers comprising the first layer material located on one or both sides of the layers (or layers) comprising the second layer material.

In an example, the process for producing the membrane involves cooling a multilayer extrudate having a first planar direction (e.g., the machine direction of extrusion or "MD") and an orthogonal second planar direction (e.g., the direction transverse to MD, called the transverse direction or "TD"). The extrudate can comprise at least first, second, and third layers, wherein the second layer is located between the first and third layers. The first and third layers of the extrudate comprise the first layer material and at least a first diluent, and the second layer of the extrudate comprises the second layer material and at least a second diluent. The first and third layers can be outer layers of the extrudate, also called skin layers. Those skilled in the art will appreciate that the third layer of the extrudate could be produced from a different layer material, e.g., the third layer material, and could have a different thickness than the first layer. The process also involves stretching the cooled extrudate in MD and/or TD and removing at least a portion of the first and second diluents from stretched extrudate to produce a dried membrane having a first dry length in the in the first planar direction and a first dry width in the second planar direction. The process then involves stretching the dried membrane along MD and optionally TD to form the final membrane. An example of producing a three-layer membrane will now be described in more detail. The disclosure is not limited to these examples, and the following description is not meant to foreclose other examples within the broader scope of this disclosure.

Combining the First Layer Material and First Diluent

The first layer material is produced by combining the first polyethylene and optionally second polyethylene e.g., by dry mixing or melt blending. The combined polymers can be combined with one or more diluents to form a mixture of polymer and diluent to produce a first mixture. The polymers can be in the form of polymer resins. The diluents can be, e.g., solvents for the polymers of the first layer material. When the diluents are such solvents, the diluent can be called a membrane-forming solvent and the combined polymer and diluent can be called a polymeric solution, e.g., a polyolefin solution. The first mixture can optionally contain additives such as one or more antioxidant. In an example, the amount of such additives is ≤1.0 wt. % based on the weight of the mixture of polymer and diluent.

The first mixture is then produced, the first mixture comprising a first diluent and the first layer material. Optionally, the first diluent is a solvent that is liquid at room temperature, although the diluent can be any species or mixture of species capable of forming a single phase with the first layer material at the extrusion temperature. While not wishing to be bound by any theory or model, we believe that the use of a liquid solvent to form the first polyolefin solution makes it possible to conduct stretching of the extrudate (generally a gel-like sheet) at a relatively high stretching magnification.

Examples of the diluent include at least one of aliphatic or cyclic hydrocarbon such as nonane, decane, decalin and paraffin oil, and phthalic acid ester such as dibutyl phthalate and dioctyl phthalate. Paraffin oil with kinetic viscosity of 20-200 cSt at 40° C. can be used. The choice of first diluent, mixing condition, extrusion condition and the like can be the same as those disclosed in PCT Publication No. WO 2008/016174, for example, which is incorporated by reference herein in its entirety.

The amount of first diluent in the combined diluent and first layer material in the first polyolefin solution is not critical. In an example, the amount of first diluent is 20.0 wt. % to 9.09 wt. %, e.g., 25.0 wt. % to 50.0 wt. %, based on the combined weight of first diluent and first layer material.

Combining the Second Layer Material and Second Diluent

A second mixture (comprising the second layer material and second diluent) can be combined by the same methods used to produce the first mixture. For example, the polymer comprising the second layer material can be combined by melt-blending the first polyethylene, the polypropylene, and optionally the second polyethylene. The second diluent can be selected from among the same diluents as the first diluent. And while the second diluent can be (and generally is) selected independently of the first diluent, the diluent can be the same as the first diluent, and can be used in the same relative concentration as the first diluent is used in the first polyolefin solution.

In an example, the method of preparing the second mixture from the method of preparing the first mixture, in that the mixing temperature is preferably the melting point (Tm2) of the polypropylene to Tm2+90° C.

Extrusion

In an example, the first mixture is conducted from a first extruder to first and third dies and the second mixture is conducted from a second extruder to a second die. A layered extrudate in sheet form (i.e., a body significantly larger in the planar directions than in the thickness direction) can be extruded (e.g., coextruded) from the first, second, and third dies to produce a multi-layer extrudate having skin layers comprising the first mixture, and a core layer comprising the second mixture.

The choice of die or dies and extrusion conditions can be the same as those disclosed in PCT Publication No. WO 2008/016174, for example.

Cooling the Multilayer Extrudate

The multilayer extrudate can be exposed to a temperature of 15° C. to 25° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publication No. WO 2008/01617, for example. In an example, the cooled extrudate has a thickness ≤10 mm, e.g., 0.1 mm to 1.0 mm, or 0.5 mm to 5.0 mm. Generally, the second layer of the cooled extrudate has a thickness of 5.0% to 15.0% of the cooled extrudate's total thickness; and the first and third layers of the cooled extrudate have substantially the same thickness, the thickness of the first and third layer each being 42.5% to 47.5% of the cooled extrudate's total thickness.

Stretching the Extrudate

The extrudate is stretched (referred to as "wet" stretching or wet orientation since the diluent is still present in the extrudate) in at least one direction (e.g., at least one planar direction such as MD or TD) to produce a stretched extrudate. Optionally, the extrudate is stretched simultaneously in the TD and MD to a magnification factor of 4 to 6. The magnification factor operates multiplicatively on film size. For example, a film having an initial width (TD) of 2.0 cm that is stretched in TD to a magnification factor of 4 fold will have a final width of 8.0 cm. Suitable stretching methods are described in PCT Publication No. WO 2008/016174, for example. While not required, the MD and TD magnifications can be the same. In an example, the stretching magnification is equal to 5 in MD and TD.

While not required, the stretching can be conducted while exposing the extrudate to a temperature in the range of from about the Tcd temperature Tm. Tcd and Tm are defined as the crystal dispersion temperature and melting point of the polyethylene having the lowest melting point among the polyethylenes used to produce the extrudate (i.e., the first and second polyethylene). The crystal dispersion temperature is determined by measuring the temperature characteristics of dynamic viscoelasticity according to ASTM D 4065. In an example where Tcd is about 90.0 to 100.0° C., the stretching temperature can be about 90 to 125° C.; preferably about 100.0 to 125.0° C., more preferably 105.0 to 125.0° C.

In an example, the stretched extrudate undergoes an optional thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polymer and diluent, its length and width are referred to as the "wet" length and "wet" width. In an example, the stretched extrudate is exposed to a temperature of 120.0° C. to 125.0° C. for a time of 1.0 second to $1.0 \times 10^2$ seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as dry orientation and heat setting where the sample (e.g., the extrudate, dried extrudate, membrane and the like) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum, for example. Other methods of exposing the sample to an elevated temperature, including conventional methods such as exposing the sample to a heated surface, infra-red heating in an oven or the like can be used with or instead heated air.

Removal of the First and Second Diluents

In an example, at least a portion of the first and second diluents (e.g., membrane-forming solvents) are removed (or displaced) from the stretched extrudate to form a dried membrane. A displacing (or "washing") solvent can be used to remove (wash away, or displace) the first and second diluents. Process conditions for removing first and second diluents can be the same as those disclosed in PCT Publication No. WO 2008/016174, for example. The term "dried membrane" refers to an extrudate from which at least a portion of the diluent has been removed. It is not necessary to remove all diluent from the stretched extrudate, although it can be desirable to do so since removing diluent increases the porosity of the final membrane.

In an example, at least a portion of any remaining volatile species such as washing solvent, can be removed from the dried membrane at any time after diluent removal. Any method capable of removing the washing solvent can be used, including conventional methods such as heat-drying, wind-drying (moving air) and the like. Process conditions for removing volatile species such as washing solvent can be the same as those disclosed in PCT Publications No. WO 2008/016174 and WO 2007/132942, for example.

Stretching the Dried Membrane

The dried membrane is stretched (called "dry stretching") in at least MD. A dried membrane that has been dry stretched is called an "oriented" membrane. Before dry stretching, the dried membrane has an initial size in MD (a first dry length) and an initial size in TD (a first dry width). As used herein, the term "first dry width" refers to the size of the dried membrane in the transverse direction prior to the start of dry orientation. The term "first dry length" refers to the size of the dried membrane in the machine direction prior to the start of dry orientation. Tenter stretching equipment of the kind described in WO 2008/016174 can be used, for example.

The dried membrane can be stretched in MD from the first dry length to a second dry length that is larger than the first dry length by a first magnification factor (the "MD dry stretching magnification factor") of about 1.1 to about 1.5. When TD dry stretching is used, the dried membrane can be stretched in TD from the first dry width to a second dry width that is larger than the first dry width by a second magnification factor (the "TD dry stretching magnification factor"). Optionally, the TD dry stretching magnification factor is ≤the MD dry stretching magnification factor. The TD dry stretching magnification factor can be about 1.1 to about 1.3 such as about 1.15 to about 1.25. The stretching (also called re-stretching since the diluent-containing extrudate has already been stretched) can be sequential or simultaneous in MD and TD. Since TD heat shrinkage generally has a greater effect on battery properties than does MD heat shrinkage, in one example the first magnification factor is >the second magnification factor.

When TD dry stretching is used, the dry stretching can be simultaneous in MD and TD or sequential. When the dry stretching is sequential, generally MD stretching is conducted first followed by TD stretching.

The dry stretching is generally conducted while exposing the dried membrane to a temperature ≤Tm, e.g., from about Tcd −30.0° C. to Tm. In an example where the membrane is a multi-layer membrane having first and third layers comprising polyethylene and a second layer comprising polypropylene that is located between the first and third layers, the stretching temperature is generally conducted with the membrane exposed to a temperature of about 70.0° C. to about 135.0° C., for example, about 80.0° C. to about 132.0° C. In one example, the MD stretching is conducted before TD stretching, and
  i) he MD stretching is conducted while the membrane is exposed to a first temperature of Tcd −30.0° C. to about Tm −10.0° C., for example, 70.0° C. to about 125.0° C., or about 80.0° C. to about 120.0° C. and
  ii) he TD stretching is conducted while the membrane is exposed to a second temperature that is higher than the first temperature but lower than Tm, for example, about 70.0° C. to about 135.0° C., or about 127.0° C. to about 132.0° C., or about 129.0° C. to about 131.0° C.

In an example, the MD dry stretching magnification factor is about 1.1 to about 1.5 such as 1.2 to 1.4; and the TD dry stretching magnification factor is about 1.1 to about 1.3 such as 1.15 to 1.25, with the MD stretching first, followed by stretching in the TD direction.

The stretching rate is preferably 3.0%/second or more in the stretching direction (MD or TD), and the rate can be independently selected for MD and TD stretching. The stretching rate is preferably 5%/second or more, more preferably 10.0%/second or more, e.g., 5.0%/second to 25.0%/second. Though not particularly critical, the upper limit of the stretching rate is preferably 50.0%/second to prevent rupture of the membrane.

Controlled Reduction of the Membrane's Width

Following the dry stretching, the dried membrane is subjected to a controlled reduction in width from the second dry width to a third width, the third dry width being in the range of from the first dry width to about 1.1 times larger than the first dry width. The width reduction generally conducted while the membrane is exposed to a temperature ≥Tcd −30.0° C., but less than Tm. For example, during width reduction the membrane can be exposed to a temperature of about 70.0° C. to about 135.0° C. such as about 127.0° C. to about 132.0° C., e.g., about 129.0° C. to about 131.0° C. In an example, the decreasing of the membrane's width is conducted while the membrane is exposed to a temperature that is lower than Tm. In an example, the third dry width is 1.0 times larger than the first dry width to about 1.1 times larger than the first dry width such as from 1.0 times larger than the first dry width to about 1.05 times larger than the first dry width We believe that exposing the membrane to a temperature during the controlled width reduction that is ≥the temperature to which the membrane was exposed during the TD stretching leads to greater resistance to heat shrinkage in the finished membrane.

Optional Heat-Setting

Optionally, the membrane is thermally treated (heat-set) one or more times after diluent removal, e.g., after dry stretching, the controlled width reduction, or both. We believe that heat-setting stabilizes crystals and make uniform lamellas in the membrane. In an example, the heat setting is conducted while exposing the membrane to a temperature of Tcd to Tm, e.g., a temperature, e.g., about 100° C. to about 135° C. such as about 127.0° C. to about 132.0° C., or about 129.0° C. to about 131.0° C. Generally, the heat setting is conducted for a time sufficient to form uniform lamellas in the membrane, e.g., a time of 1.0 to 100.0 seconds. In an example, the heat setting is operated under conventional heat-set "thermal fixation" conditions. The term "thermal fixation" refers to heat-setting carried out while maintaining the length and width of the membrane substantially constant, e.g., by holding the membrane's perimeter using tenter clips during the heat setting.

Optionally, an annealing treatment can be conducted after the heat-set step. The annealing is a heat treatment with no load applied to the membrane, and may be conducted by using, e.g., a heating chamber with a belt conveyer or an air-floating-type heating chamber. The annealing may also be conducted continuously after the heat-setting with the tenter slackened. During annealing the membrane can be exposed to a temperature of Tm or lower, e.g., about 60° C. to about Tm −5° C. Annealing is believed to provide the microporous membrane with improved permeability and strength.

Optional heated roller, hot solvent, cross linking, hydrophilizing, and coating treatments can be conducted if desired, e.g., as described in PCT Publication No. WO 2008/016174.

Optionally, an annealing treatment can be conducted before, during, or after the heat-setting. The annealing is a heat treatment with no load applied to the membrane, and can be conducted by using, e.g., a heating chamber with a belt conveyer or an air-floating-type heating chamber. The annealing can be conducted continuously, e.g., after the heat-setting with the tenter slackened. The temperature to which the membrane is exposed during annealing, (the "annealing temperature") can be, e.g., from about 126.9° C. to 128.9° C. Annealing is believed to provide the microporous membrane with improved heat shrinkage and strength.

Optional heated roller, hot solvent, cross linking, hydrophilizing, and coating treatments can be conducted if desired, e.g., as described in PCT Publication No. WO 2008/016174.

Properties of the Multi-Layer Microporous Membrane

In an example, the membrane is a multi-layer microporous membrane. The membrane's thickness is generally 3.0 µm or more. For example, the membrane can have a thickness of about 5.0 µm to about 200.0 µm, e.g., about 10.0 µm to about 50.0 µm. The membrane's thickness can be measured, e.g., by a contact thickness meter at 1.0 cm longitudinal intervals over the width of 10.0 cm, and then averaged to yield the membrane thickness. Thickness meters such as the Litematic available from Mitsutoyo Corporation are suitable. This method is also suitable to measure thickness variation after heat compression, as described below. Non-contact thickness measurement methods are also suitable, e.g., optical thickness measurement methods.

Optionally, the membrane has one or more of the following properties.

A. Porosity

In an example, the membrane has a porosity ≥25.0%, e.g., about 25.0% to about 80.0%, or 30.0% to 60.0%. The membrane's porosity is measured conventionally by comparing the membrane's actual weight to the weight of an equivalent non-porous membrane of the same composition (equivalent in the sense of having the same length, width, and thickness). Porosity is then determined using the formula: Porosity %=100×(w2−w1)/w2, wherein "w1" is the actual weight of the microporous membrane and "w2" is the weight of an equivalent non-porous having the same size and thickness.

B1. Normalized Air Permeability

In an example, the membrane's normalized air permeability (Gurley value, normalized to an equivalent membrane thickness of 20.0 µm) is ≤4.0×10² seconds/100 cm³/20 µm. Since the air permeability value is normalized to a film thickness of 20 µm, the air permeability value is expressed in units of "seconds/100 cm³/20 µm." In an example, the normalized air permeability is 100.0 seconds/100 cm³/20 µm to about 400.0 seconds/100 cm³/20 µm, or 150.0 seconds/100 cm³/20 µm to 390.0 seconds/100 cm³/20 µm. Normalized air permeability is measured according to JIS P8117, and the results are normalized to a value at a thickness of 20 µm using the equation $A = 20\ \mu m^*(X)/T_1$, where X is the measured air permeability of a membrane having an actual thickness $T_1$ and A is the normalized air permeability at a thickness of 20 µm.

B2. Air Permeability after Heat Compression

In an example, the membrane's air permeability after heat compression is <1.0×10³ seconds/100 cm³, e.g., 500.0 seconds/100 cm³ to 750.0 seconds/100 cm³. Air permeability after heat compression is measured according to JIS P8117 after the membrane is subjected to a compression of 2.2 MPa (22 kgf/cm²) in the thickness direction for five minutes while the membrane is exposed to a temperature of 90.0° C.

C. Normalized Pin Puncture Strength

In an example, the membrane has a pin puncture strength ≥2.0×10³ mN/20 µm, e.g., 3.0×10³ mN/20 µm to 5.0×10³ mN/20 µm. Pin puncture strength is defined as the maximum load measured when a microporous membrane having a thickness of $T_1$ is pricked with a needle of 1.0 mm in diameter with a spherical end surface (radius R of curvature: 0.5 mm) at a speed of 2.0 mm/second. The pin puncture strength is normalized to a value at a membrane thickness of 20 µm using the equation $S_2 = 20\ \mu m^*(S_1)/T_1$, where $S_1$ is the measured pin puncture strength, $S_2$ is the normalized pin puncture strength, and $T_1$ is the average thickness of the membrane.

D. Tensile Strength

In an example, the membrane has an MD tensile strength ≥9.0×10⁴ kPa, e.g., 1.0×10⁵ to 1.1×10⁵ kPa, and a TD tensile strength >5.5×10⁴, of 8.0×10⁴ kPa to 1.0×10⁵ kPa. Tensile strength is measured in MD and TD according to ASTM D-882A.

E. Tensile Elongation ≥100%

Tensile elongation is measured according to ASTM D-882A. In an example, the membrane's MD and TD tensile elongation are each ≥150%, e.g., 150% to 350%. In another example, the membrane's MD tensile elongation is, e.g., 150% to 250% and TD tensile elongation is, e.g., 150% to 250%.

F. Shutdown Temperature

In an example, the membrane has a shutdown temperature ≤140.0° C., e.g., about 132.0° C. to about 138.0° C. The shutdown temperature of the microporous membrane is measured by a thermomechanical analyzer (TMA/SS6000 available from Seiko Instruments, Inc.) as follows: A rectangular sample of 3.0 mm×50.0 mm is cut out of the microporous membrane such that the long axis of the sample is aligned with membrane's TD and the short axis is aligned with MD. The sample is set in the thermomechanical analyzer at a chuck distance of 10.0 mm, i.e., the distance from the upper chuck to the lower chuck is 10.0 mm. The lower chuck is fixed and a load of 19.6 mN applied to the sample at the upper chuck. The chucks and sample are enclosed in a tube which can be heated. Starting at 30.0° C., the temperature inside the tube is elevated at a rate of 5.0° C./minute, and sample length change under the 19.6 mN load is measured at intervals of 0.5 seconds and recorded as temperature is increased. The temperature is increased to 200.0° C. "Shutdown temperature" is defined as the temperature of the inflection point observed at approximately the melting point of the polymer having the lowest melting point among the polymers used to produce the membrane.

G. Meltdown Temperature

In an example, the membrane's meltdown temperature is >170.0° C., e.g., 171.0° C. to 200.0° C., or 172.0° C. to 190.0° C. The membrane meltdown temperature is measured by the following procedure: A rectangular sample of 3.0 mm×50.0 mm is cut out of the microporous membrane such that the long axis of the sample is aligned with the microporous membrane's TD as it is produced in the process and the short axis is aligned with MD. The sample is set in the thermomechanical analyzer (TMA/SS6000 available from Seiko Instruments, Inc.) at a chuck distance of 10.0 mm, i.e., the distance from the upper chuck to the lower chuck is 10 mm. The lower chuck is fixed and a load of 19.6 mN applied to the sample at the upper chuck. The chucks and sample are enclosed in a tube which can be heated. Starting at 30.0° C., the temperature inside the tube is elevated at a rate of 5.0° C./minute, and sample length change under the 19.6 mN load is measured at intervals of 0.5 second and recorded as temperature is increased. The temperature is increased to 200.0° C. The meltdown temperature of the sample is defined as the temperature at which the sample breaks, generally at a temperature of about 145° C. to about 200° C.

In an example, the meltdown temperature is 170.0° C. to 180.0° C. Since the membrane has a desirably high meltdown temperature, it is suitable for use as a battery separator in high-power, high capacity lithium ion batteries such as those used for powering electric vehicles and hybrid electric vehicles.

H. Thickness Variation Ratio after Heat Compression

In an example, the membrane's thickness variation ratio after heat compression is ≤20.0% of the thickness of the membrane before the heat compression, e.g., of 5.0% to 10.0%. Thickness variation after heat compression is measured by subjecting the membrane to a compression of 2.2 MPa (22 kgf/cm$^2$) in the thickness direction for five minutes while the membrane is exposed to a temperature of 90.0° C. The membrane's thickness variation ratio is defined as the absolute value of (average thickness after compression −average thickness before compression)/(average thickness before compression)×100.

I. Electrolytic Solution Absorption Speed

In an example, the membrane has an electrolytic solution absorption speed ≥3.0, e.g., in the range of 3.2 to 5.0. Using a dynamic surface tension measuring apparatus (DCAT21 with high-precision electronic balance, available from Eko Instruments Co., ltd.), a microporous membrane sample is immersed in an electrolytic solution for 600 seconds (electrolyte: 1 mol/L of LiPF$_6$, solvent: ethylene carbonate/dimethyl carbonate at a volume ratio of 3/7) kept at 18.0° C., to determine an electrolytic solution absorption speed by the formula of [weight (in grams) of microporous membrane after immersion/weight (in grams) of microporous membrane before immersion]. The electrolytic solution absorption speed is expressed by a relative value, assuming that the electrolytic solution absorption rate in the microporous membrane of Comparative Example 1 is 1.0. Battery separator film having a relatively high electrolytic solution absorption speed (e.g., ≥3.0) are desirable since less time is required for the separator to uptake the electrolyte during battery manufacturing, which in turn increases the rate at which the batteries can be produced.

J. Heat Shrinkage at 105° C. in at Least One Planar Direction <1.0%

In an example, the membrane has a heat shrinkage at 105° C. in at least one planar direction (e.g., MD or TD) of ≤1.0%, e.g., ≤0.5% such as from 0.1% to 0.25%. The membrane's shrinkage at 105° C. in MD and TD is measured as follows: (i) Measure the size of a test piece of microporous membrane at ambient temperature in both the MD and TD, (ii) equilibrate the test piece of the microporous membrane at a temperature of 105° C. for 8 hours with no applied load, and then (iii) measure the size of the membrane in both the MD and TD. The heat (or "thermal") shrinkage in MD and TD can be obtained by dividing the result of measurement (i) by the result of measurement (ii) and expressing the resulting quotient as a percent.

K. TD Heat Shrinkage at 130° C.

In an example, the membrane has a TD heat shrinkage measured at 130° C. ≤8.0%, e.g., 1% to 7.5%. A relatively low heat shrink value, e.g., ≤8.0% can be of particular significance since 130° C. is generally within the operating temperature range of a lithium ion secondary battery during charging and discharging, albeit near the upper (shut-down) end of this range.

The measurement is slightly different from the measurement of heat shrinkage at 105° C., reflecting the fact that the edges of the membrane parallel to the membrane's TD are generally fixed within the battery, with a limited degree of freedom allowed for expansion or contraction (shrinkage) in TD, particularly near the center of the edges parallel to the membrane's MD. Accordingly, a square sample of microporous film measuring 50 mm along TD and 50 mm along MD is mounted in a frame, with the edges parallel to TD fixed to the frame (e.g., by tape) leaving a clear aperture of 35 mm in MD and 50 mm in TD. The frame with sample attached is then heated in thermal equilibrium (e.g., in an oven) at a temperature of 130° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

L. Maximum Heat Shrinkage in Molten State

Maximum shrinkage in the molten state in a planar direction of the membrane is measured by the following procedure:

Using the TMA procedure described for the measurement of meltdown temperature, the sample length measured at temperature of 135° C. to 145° C. are recorded. The membrane shrinks, and the distance between the chucks decreases as the membrane shrinks The maximum shrinkage in the molten state is defined as the sample length between the chucks measured at 23.0° C. (L1 equal to 10 mm) minus the minimum length measured generally at about 135° C. to about 145.0° C. (equal to L2) divided by L1, i.e., [L1−L2]/L1*100%. When TD maximum shrinkage is measured, the rectangular sample of 3.0 mm×50.0 mm used is cut out of the microporous membrane such that the long axis of the sample is aligned with the transverse direction of the microporous membrane as it is produced in the process and the short axis is aligned with the machine direction. When MD maximum shrinkage is measured, the rectangular sample of 3.0 mm×50.0 mm used is cut out of the microporous membrane such that the long axis of the sample is aligned with the machine direction of the microporous membrane as it is produced in the process and the short axis is aligned with the transverse direction.

In an example, the membrane's maximum MD heat shrinkage in the molten state is ≤25.0% or ≤20.0%, e.g., 1.0% to 25.0%, or 2.0% to 20.0%. In an example, the membrane's maximum TD heat shrinkage in the molten state is ≤11.0%, or ≤6.0%, e.g., 1.0% to 10.0%, or 2.0% to 5.5%.

Battery

The microporous membranes are useful as battery separators in, e.g., lithium ion primary and secondary batteries. Such batteries are described in PCT publication WO 2008/016174 which is incorporated by reference herein in its entirety.

Figure 2:
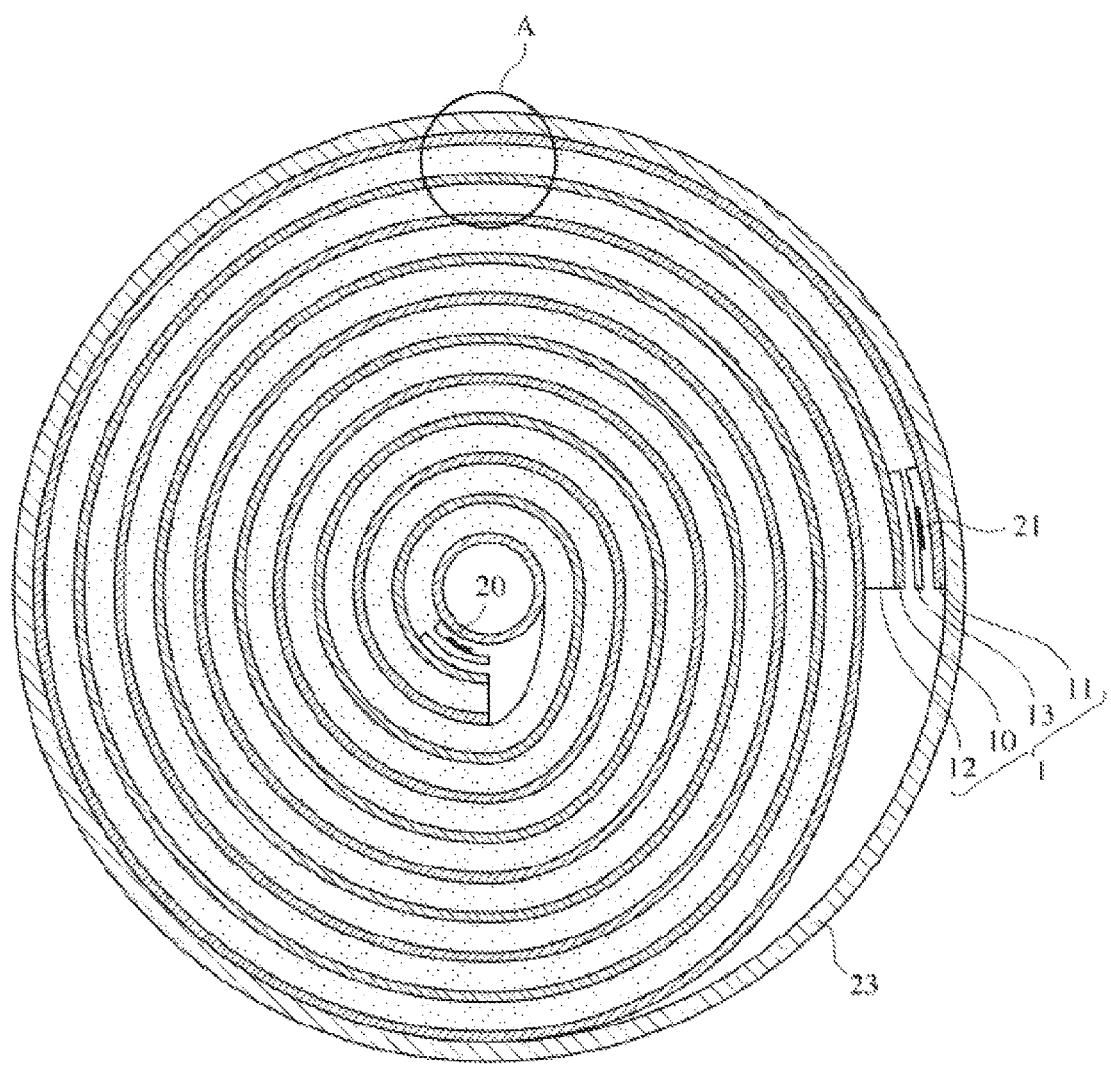
FIG. 2 is a cross-sectioned view showing the battery in FIG. 1.

FIG. 1 shows an example of a cylindrical-type lithium ion secondary battery comprising two battery separators. The microporous membranes are suitable for use as battery separators in this type of battery. The battery has a toroidal-type electrode assembly 1 comprising a first separator 10, a second separator 11, a cathode sheet 13, and an anode sheet 12. The separators' thicknesses are not to scale, and are greatly magnified for the purpose of illustration. The toroidal-type electrode assembly 1 can be wound, e.g., such that the second separator 11 is arranged on an outer side of the cathode sheet 13, while the first separator 10 is arranged on the inner side of the cathode sheet. In this example, the second separator 11 is arranged on inside surface of the toroidal-type electrode assembly 1, as shown in FIG. 2.

Figure 3:
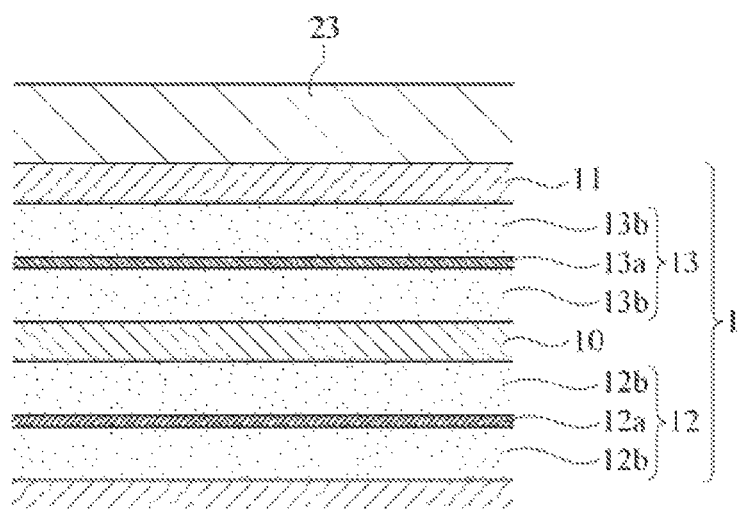
FIG. 3 is an enlarged cross-sectioned view showing a portion A in FIG. 2.

In this example, an anodic active material layer 12b is formed on both sides of the current collector 12a, and a cathodic active material layer 13b is formed on both sides of the current collector 13a, as shown in FIG. 3. As shown in FIG. 2, an anode lead 20 is attached to an end portion of the anode sheet 12, and a cathode lead 21 is attached to an end portion of the cathode sheet 13. The anode lead 20 is connected with battery lid 27, and the cathode lead 21 is connected with the battery can 23.

While a battery of cylindrical form is illustrated, the disclosure is not limited thereto, and the separators are suitable for use in, e.g., prismatic batteries such as those containing electrodes in the form of stacked plates of anode(s) 12 and a cathode (3) 13 alternately connected in parallel with the separators situated between the stacked anodes and cathodes.

When the battery is assembled, the anode sheet 12, the cathode sheet 13, and the first and second separators 10, 11 are impregnated with the electrolytic solution so that the separator 10, 11 (microporous membranes) are provided with ion permeability. The impregnation treatment is can be conducted, e.g., by immersing electrode assembly 1 in the electrolytic solution at room temperature. A cylindrical type lithium ion secondary battery can be produced by inserting the toroidal-type electrode assembly 1 (see FIG. 1) into a battery can 23 having a insulation plate 22 at the bottom, injecting the electrolytic solution into the battery can 23, covering the electrode assembly 1 with a insulation plate 22, caulking a battery lid (24, 25, 26, and 27) to the battery can 23 via a gasket 28. The battery lid functions as an anode terminal.

FIG. 3 (oriented so that the battery lid, i.e., the anode terminal of FIG. 1, is toward the right) illustrates the advantage of using a separator having diminished tendency to shrinkage in the transverse direction (with respect to the separator manufacturing process) as the battery temperature increases. One role of the separator is to prevent contact of the anodic active material layer and the cathodic active material layer. In the event of a significant amount of TD heat-shrinkage, the thin edges of the separators 10 and 11 move away from the battery lid (move leftward in FIG. 3), thereby allowing contact between the anodic active material layer and the cathodic active material layer, resulting in a short circuit. Since the separators can be quite thin, usually less than 200 μm, the anodic active material layer and the cathodic active material layer can be quite close. Consequently, even a small decrease in the amount of separator TD shrinkage at elevated battery temperature can make a significant improvement in the battery's resistance to internal short circuiting.

The battery is useful as a source or sink of power from one or more electrical or electronic components, Such components include passive components such as resistors, capacitors, inductors, including, e.g., transformers; electromotive devices such as electric motors and electric generators, and electronic devices such as diodes, transistors, and integrated circuits. The components can be connected to the battery in series and/or parallel electrical circuits to form a battery system. The circuits can be connected to the battery directly or indirectly. For example, electricity flowing from the battery can be converted electrochemically (e.g., by a second battery or fuel cell) and/or electromechanically (e.g., by an electric motor operating an electric generator) before the electricity is dissipated or stored in a one or more of the components. The battery system can be used as a power source for moving an electric vehicle or hybrid electric vehicle, for example. In one example, the battery is electrically connected to an electric motor and/or an electric generator for powering an electric vehicle or hybrid electric vehicle.

This disclosure will be explained in more detail referring to Examples below without intention of restricting the scope of this disclosure.

EXAMPLES

Example 1

(1) Preparation of First Polyolefin Solution

A first polyolefin composition is prepared by dry-blending (a) 68.6 wt. % of a first polyethylene resin having an Mw of $5.6 \times 10^5$ and an MWD of 4.05, (b) 1.4 wt. % second polyethylene resin having an Mw of $1.9 \times 10^6$ and an MWD of 5.09, and (c) 30 wt. % polypropylene resin having an Mw of $1.1 \times 10^6$, a heat of fusion of 114 J/g and an MWD of 5.0, the percentages being based on the weight of the first polyolefin composition. The first polyethylene resin in the composition has a Tm of 135° C. and a Tcd of 100° C.

35 wt. % of the resultant first polyolefin composition is charged into a first strong-blending double-screw extruder having an inner diameter of 58 mm and L/D of 42, and 65.0 wt. % of liquid paraffin (50 cst at 40° C.) is supplied to the double-screw extruder via a side feeder to produce a first polyolefin solution. The weight percents are based on the weight of the first polyolefin solution. Melt-blending is conducted at 210° C. and 200 rpm.

(2) Preparation of Second Polyolefin Solution

A second polyolefin solution is prepared in the same manner as above by dry-blending (a) 9.0 wt. % of a first polyethylene resin having an Mw of $5.6 \times 10^5$ and an MWD of 4.05, and (b) 5.0 wt. % of a second polyethylene resin having an Mw of $1.9 \times 10^6$ and an MWD of 5.09, the percentages being based on the weight of the second polyolefin composition. The first polyethylene resin in the composition has a Tm of 135° C. and a Tcd of 100° C.

35.0 wt. % of the resultant second polyolefin composition is charged into a second strong-blending double-screw extruder having an inner diameter of 58 mm and L/D of 42, and 65.0 wt. % of liquid paraffin (50 cst at 40° C.) is supplied to the double-screw extruder via a side feeder to produce the second polyolefin solution. The weight percents are based on the weight of the second polyolefin solution. Melt-blending is conducted at 210° C. and 200 rpm.

(3) Production of Membrane

The first and second polyolefin solutions are supplied from their respective double-screw extruders to a three-layer-extruding T-die, and extruded therefrom to produce a layered extrudate (also called a laminate) of second polyolefin solution layer/first polyolefin solution layer/second polyolefin solution layer at a layer thickness ratio of 45/10/45. The extrudate is cooled while passing through cooling rollers controlled at 20.0° C., producing an extrudate in the form of a three-layer gel-like sheet. The gel-like sheet is biaxially stretched (simultaneously) in MD and TD while exposed to a temperature of 119° C. (the "biaxial stretching temperature") to a magnification of 5 fold in each of MD and TD by a tenter-stretching machine. The stretched three-layer gel-like sheet is fixed to an aluminum frame of 20 cm×20 cm, immersed in a bath of methylene chloride controlled at 25° C. for three minutes to remove the liquid paraffin, and dried by air flow at room temperature to produce a dried membrane. The dried membrane is then dry stretched. Before dry stretching, the dried membrane has an initial dry length (MD) and an initial dry width (TD). The dried membrane is first dry-stretched in MD to a magnification of 1.4 fold while exposed to a temperature of 115° C. (the "MD stretching temperature," resulting in a second dry length. The membrane's width (TD) remains approximately equal to the initial dry width during the MD dry stretching. The dried membrane is then dry-stretched in TD to a magnification of 1.2 fold (resulting in a second dry width) while exposed to a temperature of 130° C. (the "TD stretching temperature"). The membrane's length (MD) remains approximately equal to the second dry length during the TD dry stretching. Following TD dry-stretching, the membrane is subjected to a controlled reduction in width (TD) from the second dry width to a final magnification of 1.0 fold, the final magnification being based on the initial width of the membrane at the start of dry stretching, while exposed to a temperature of at 130.0° C. (the "width reduction temperature"). In other words, width reduction is carried out until the membrane's final width is substantially the same as the membrane's initial dry width. The membrane's length (MD) remains approximately equal to the second dry length during the width reduction. The membrane, which remains fixed to the batch-stretching machine, is then heat-set while exposed to a temperature of 130.0° C. (the "heat set temperature") for 10 minutes to produce the final multi-layer microporous membrane.

Example 2

Example 1 is repeated except the first polyolefin composition comprises 70 wt. % first polyethylene resin, no added second polyethylene resin, and 30 wt. % polypropylene resin; the biaxial stretching temperature is 118.5° C.; and the MD dry stretching is carried out to a magnification of 1.25 at an MD stretching temperature of 120.0° C.

Comparative Example 1

Example 1 is repeated except the first polyolefin composition comprises 80 wt. % of the first polyethylene resin, 20.0 wt. % of the second polyethylene resin; there is no second polyolefin solution; the first polyolefin solution comprises 20.0 wt. % of the first polyolefin composition and 80.0 wt. % of liquid paraffin; the extrudate is not a layered extrudate, i.e., it has a single layer produced from the first polyolefin solution; the biaxial stretching temperature is 115.0° C.; there is no dry stretching in MD or TD; there is no width reduction step; and the heat set temperature is 127.0° C.

Comparative Example 2

Example 2 is repeated except the biaxial stretching temperature is 117.0° C.; there is no MD dry stretching; the TD dry stretching is carried out to a magnification of 1.4 fold at a TD stretching temperature of 126.0° C.; there is no width reduction step; and the heat setting temperature is 126.0° C.

Comparative Example 3

Comparative Example 2 is repeated except there is no MD dry stretching; the TD width reduction is carried out to a magnification of 1.2 fold based on the initial dry width before the start of dry stretching; and TD stretching temperature, the width reduction temperature, and the heat set temperature are all 126.0° C.

Comparative Example 4

Comparative Example 2 is repeated except the polypropylene resin has an Mw of $1.56 \times 10^6$, a heat of fusion of 78.4 J/g, and an MWD of 3.2.

Comparative Example 5

Example 1 is repeated except first polyolefin composition comprises (a) 49.0 wt. % of the first polyethylene resin, (b) 1.0 wt. % of the second polyethylene, and (c) 50.0 wt. % of the polypropylene resin; the second polyolefin resin comprises (a) 70.0 wt. % of the first polyethylene resin and (b) 30.0 wt. % of the second polyethylene resin; the first polyolefin solution comprises 25.0 wt. % of the first polyolefin composition and 75.0 wt. % of liquid paraffin; the second polyolefin solution comprises 28.5 wt. % of the second polyolefin composition and 71.5 wt. % of the liquid paraffin; the first and second polyolefin solutions are extruded to produce a layered extrudate of second polyolefin solution/first polyolefin solution/second polyolefin solution at a layer thickness ratio of 10/80/10; and the TD stretching temperature, the width reduction temperature, and the heat set temperature are all 128.0° C.

Comparative Example 6

Example 2 is repeated except the first polyolefin composition of the first polyolefin composition comprises 30.0 wt. % of the first polyethylene resin and 70.0 wt. % of the polypropylene resin; the biaxial stretching temperature is 117.5° C.; the MD dry stretching magnification is 1.3 fold and the MD stretching temperature is 80° C.; the controlled width reduction is carried out to magnification of 1.1 fold, and the based on the size of the membrane at the start of dry-stretching; and TD stretching temperature, the width reduction temperature, and the heat set temperature are all 130.0° C.

The properties of the multi-layer microporous membranes of the Examples and Comparative Examples are shown in Table 1.

TABLE 1

| PROPERTIES | Ex 1 | Ex 2 | Comp Ex 1 | Comp Ex 2 | Comp Ex 3 | Comp Ex 4 | Comp Ex 5 | Comp Ex 6 |
|---|---|---|---|---|---|---|---|---|
| Thickness μm | 20.0 | 26.9 | 20.3 | 18.4 | 19.0 | 19.8 | 20.0 | 20.1 |
| Air Perm. | 185 | 384 | 480 | 280 | 300 | 410 | 280 | 287 |
| Porosity % | 39.6 | 33.0 | 40.5 | 50.3 | 49.0 | 43.8 | 48.0 | 47.5 |
| Punct. Strength | 3430 | 3675 | 4900 | 4214 | 4116 | 4998 | 4116 | 4214 |
| Tensile Strength | 102900 | 107800 | 142100 | 117600 | 117600 | 137200 | 112700 | 100450 |
| MD/TD (kPa) | 82320 | 96040 | 117600 | 118580 | 117600 | 142100 | 98000 | 97020 |
| Tensile Elongation | 170 | 210 | 140 | 150 | 150 | 150 | 190 | 160 |
| MD/TD (%) | 160 | 220 | 240 | 145 | 140 | 140 | 180 | 150 |
| Heat Shrinkage 105° C. MD/TD | 7.5 | 2.0 | 6.0 | 7.1 | 7.1 | 7.5 | 7.5 | 3.5 |
|  | 0.2 | 0 | 5.5 | 9.9 | 7.0 | 10.2 | 2.4 | 3.0 |
| Heat Shrinkage 130° C., TD | 7.1 | 5.4 | 34.7 | 31.2 | 27.3 | 35.1 | 10.2 | 9.3 |
| Electrolytic Solution Absorption Speed | 3.3 | 3.3 | 1.0 | 2.3 | 2.6 | 3.9 | 3.1 | 3.1 |
| Thick. Var. Aft. Heat Comp. % | 7.0 | 8.0 | 18.0 | 8.0 | 8.0 | 17.0 | 7.0 | 9.0 |
| Air Perm. Aft. Heat Comp. | 660 | 714 | 1049 | 780 | 815 | 1105 | 580 | 640 |
| Shutdown Temp. ° C. | 136 | 135 | 135 | 135 | 135 | 135 | 136 | 136 |
| Meltdown Temp. ° C. | 172 | 172 | 148 | 179 | 178 | 160 | 175 | 178 |
| Max. Shrinkage in Molten State | 19.5 | 9.3 | 38.0 | 32.8 | 28.6 | 34.5 | 25.0 | 12.5 |
| (%) MD/TD | 5.0 | 0.0 | 32.0 | 15.8 | 10.0 | 24.2 | 7.5 | 4.0 |

It is noted from Table 1 that the microporous membrane of exhibits well-balanced important properties, including a TD heat shrinkage at 105° C. of 0.5% or less, with good balance of other thermal and mechanical properties.

On the other hand, the microporous membrane products of the Comparative Examples exhibit a poorer heat shrinkage at 105° C., and a generally higher air permeability (Comparative Example 1), higher air permeability after heat compression, lower meltdown temperature (Comparative Example 1) and higher thermal mechanical analysis (TMA) maximum TD shrinkage in the molten state at about 140° C. Comparative Examples 5 and 6 have relatively high TD heat shrinkage at 105° C., it is believed, because those membranes have core layers containing more than 40 wt. % of the polypropylene.

The multi-layer microporous membrane with well-balanced properties and use of such multi-layer microporous membrane as a battery separator provides batteries having excellent safety, heat resistance, retention properties and productivity.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A method of producing a microporous membrane comprising:

(a) stretching a multi-layer extrudate in at least one of a machine direction (MD) or traverse direction (TD), the extrudate comprising at least first and second layers, the first layer comprising a first polyolefin and at least a first diluent, and the second layer comprising a second polyolefin and at least a second diluent, the second polyolefin comprising polypropylene in an amount in the range of from 25.0 wt. % to 35.0 wt. % based on the weight of the second polyolefin, the polypropylene having an Mw>0.9×10$^6$ and a ΔHm ≥100.0 J/g;

(b) removing at least a portion of the first and second diluents from the stretched extrudate to produce a dried membrane having a first length along MD and a first width along TD;

(c) stretching the membrane in MD from the first length to a second length larger than the first length by a first magnification factor in the range of from about 1.1 to about 1.5 followed by stretching the membrane in TD from the first width to a second width that is larger than the first width by a second magnification factor in the range of from about 1.1 to about 1.3, wherein the TD dry stretching magnification factor is less than the MD dry stretching magnification factor; and then (d) reducing the second width to a third width, the third width being in the range of from the first width to about 1.1 times larger than the first width, such that the membrane has a TD 105° C. heat shrinkage of 0.5% or less, a 130° C. heat shrinkage of 8.0% or less in at least one planar direction, and a TD maximum shrinkage in a molten state of 11.0% or less.

2. The method of claim 1, further comprising removing at least a portion of any volatile species from the extrudate after step (b).

3. The method of claim 1, wherein (i) the first polyolefin comprises a first polyethylene in an amount in the range of from 90.0 wt. % to 99.0 wt. % and a second polyethylene in an amount in the range of from about 1.0 wt. % to 10.0 wt. %, the weight percents being based on the weight of the first polyolefin, the first polyethylene having an $Mw \leq 1.0 \times 10^6$ and the second polyethylene having an $Mw > 1.0 \times 10^6$;

(ii) the second polyolefin comprises the polypropylene in an amount in the range of 25.0 wt. % to 35.0 wt. %, and further comprises (i) a first polyethylene having an $Mw \leq 1.0 \times 10^6$ in an amount in the range of 60.0 wt. % to 90.0 wt. % and (ii) a second polyethylene having an $Mw > 1.0 \times 10^6$ in an amount in the range of from 0.0 wt. % to 10.0 wt. %, the weight percents being based on the weight of the second polyolefin;

(iii) the first diluent is present in the first layer of the extrudate in an amount in the range of from about 25.0 wt. % to about 99.0 wt. % based on the weight of the combined weight of the first polyolefin and the first diluent; and (iv) the second diluent is present in the second layer of the extrudate in an amount in the range of from about 25.0 wt. % to about 99.0 wt. % based on the combined weight of second polyolefin and second diluent.

4. The method of claim 1, wherein the extrudate further comprises a third layer comprising a third polyolefin, the third polyolefin comprising a first polyethylene in an amount in the range of from 90.0 wt. % to 99.0 wt. % and a second polyethylene in an amount in the range of from about 1.0 wt. % to 10.0 wt. %, the weight percents being based on the weight of the third polyolefin, the first polyethylene having an $Mw \leq 1.0 \times 10^6$ and the second polyethylene having an $Mw > 1.0 \times 10^6$.

5. The method of claim 1, wherein (i) the extrudate is a three-layer extrudate;

(ii) the second layer is located between the first and third layers and is in planar contact with the first and third layers;

(iii) the first polyolefin and the second polyolefin are the same polyolefin;

(iv) the second layer has a thickness of 5.0% to 15.0% of the extrudate's total thickness; and (v) the first and third layers have the same thickness, the thickness of the first and third layers each being in the range of 42.5% to 47.5% of the extrudate's total thickness.

6. The method of claim 1, wherein the first and second diluents are independently selected from one or more of nonane, decane, decalin, and liquid paraffin.

7. The method of claim 1, wherein the stretching of step (a) is conducted by simultaneously stretching the extrudate in MD and TD.

8. The method of claim 7, wherein during step (c) the MD stretching is conducted before the TD stretching, wherein the TD stretching is conducted to a second magnification factor in the range of from 1.15 to 1.25, wherein the first magnification factor is >the second magnification factor, and wherein (i) the MD stretching is conducted while the membrane is exposed to a first temperature in the range of Tcd−30.0° C. to about Tm−10.0° C. and (ii) the TD stretching is conducted while the membrane is exposed to a second temperature that is higher than the first temperature but lower than Tm; and wherein the reducing of step (d) is conducted while the membrane is exposed to a temperature ≥the second temperature.

9. The method of claim 8 wherein the third width is in the range of 1.0 to 1.05 times the first width.

10. The method of claim 8, wherein the first magnification factor is in the range of 1.2 to 1.4.

* * * * *